United States Patent
Suzuki et al.

[11] 3,884,668
[45] May 20, 1975

[54] APPARATUS FOR PRODUCING GLASS PELLETS

[76] Inventors: Kiitiro Suzuki, 64-6, Aza-Yashikiura; Minoru Hunakawa, 1-banchi, Aza-Maeyama, both of Nishigo-Mura, Nishishirakawa-gun, Hukushima-ken, Japan

[22] Filed: Mar. 1, 1974

[21] Appl. No.: 447,385

[52] U.S. Cl. ............ 65/142; 65/176; 65/187
[51] Int. Cl. ............ C03b 19/00; C03b 9/46
[58] Field of Search ........... 65/142, 169, 174, 176, 65/187, 190, 137

[56] References Cited
UNITED STATES PATENTS

| | | | |
|---|---|---|---|
| 1,949,037 | 2/1934 | Cardot | 65/187 X |
| 1,951,993 | 3/1934 | Pond | 65/187 X |
| 2,462,808 | 2/1949 | Donner | 65/187 |
| 2,521,352 | 9/1950 | Dockerty et al. | 65/176 X |
| 2,591,304 | 4/1952 | Schuller | 65/169 X |
| 3,198,616 | 8/1965 | Havens | 65/169 |
| 3,554,723 | 1/1971 | Wilson | 65/187 X |

FOREIGN PATENTS OR APPLICATIONS

| | | | |
|---|---|---|---|
| 1,598,242 | 11/1968 | France | 65/174 |
| 3,821,611 | 1963 | Japan | |

*Primary Examiner*—Robert L. Lindsay, Jr.
*Attorney, Agent, or Firm*—McGlew and Tuttle

[57] ABSTRACT

An apparatus for continuously mass-producing small pieces or pellets of glass from a glass bar. Molten glass is discharged from a port of a melting furnace and placed onto a chain conveyer in a shape of long bar. The long glass bar is conveyed to a cutter comprising a blade wheel provided with a plurality of blades striking or cutting small pieces from the glass bar. The hot glass bar running along the chain conveyer is chilled by a forced compressed-air cooling system arranged over and along the length of the chain conveyer.

10 Claims, 13 Drawing Figures

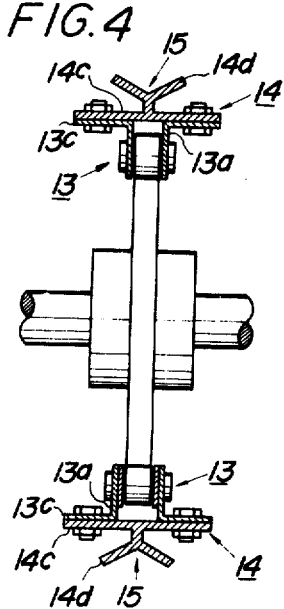
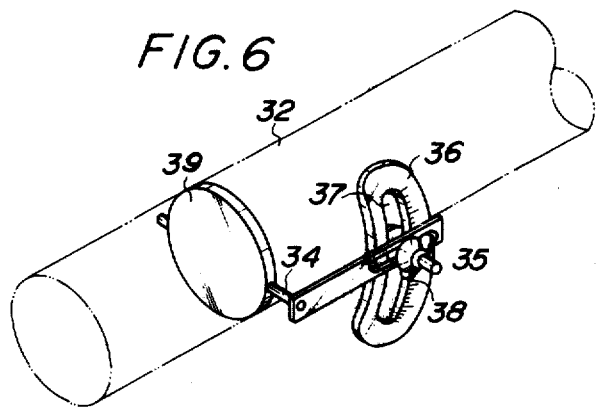
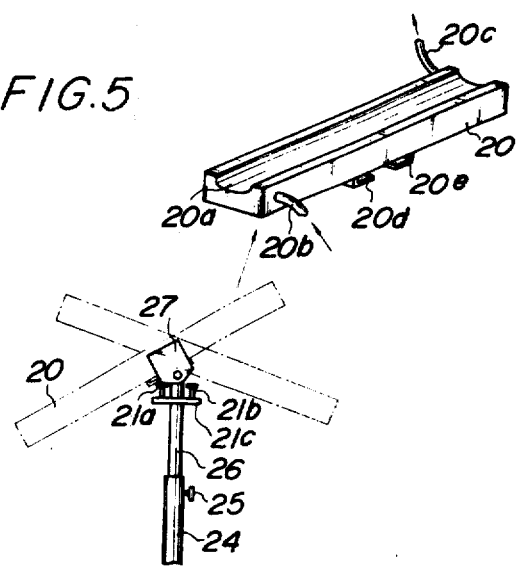

APPARATUS FOR PRODUCING GLASS PELLETS

BACKGROUND OF THE INVENTION

1. Field of the Invention

This invention relates to an apparatus for making glass pellets and more particularly to an apparatus for producing a large quantity of short glass bars or glass pellets, used as material for glass fiber, from a long glass bar having an optional section shape.

2. Description of the Prior Art

According to the prior art, a typical apparatus for making glass pellets is Dunner's apparatus. In accordance with his system described in the specification of U.S. Pat No. 1219709, the conventional apparatus for making glass pellets has a discharging spindle or mandrel situated just after a discharging outlet of a glass melting furnace, glass-bar tracting means placed at a position separated far from the discharging spindle, and a cutter for cutting a drawn and chilled glass bar into small pieces for pellets. As apparent from the specification and drawings of Dunner's Patent, the glass bar is drawn a long distance in air between the discharging outlet of the melting furnace and the glass bar tracting means. Consequently, this conventional apparatus for making glass pellets occupies a rather large space of a factory and is complicated. Additionally, operation of the conventional apparatus disadvantageously needs a rather advanced technique and involves dangerous conditions for operators.

With respect to the cutting means used for cutting the glass bar discharged from the melting furnace and supplied thereto, various types have been employed. The conventional cutting device as disclosed in the laid-open specification of Japanese Pat. application; No.21611/1963 comprises a cutting wheel having a plurality of blades adapted to cut small pieces from the glass bar extending through an outlet. The prior art cutting device shown in a laid-open specification of Japanese Utility Model No.32137/1970 includes a plurality of rollers for holding the running glass bar. During operation of this prior art cutting device, one of these rollers is mounted in such a manner that pay-out end portions of the glass bars are pressed from above in order to cut them successively. More particularly, the former one uses two forming rollers provided with a plurality of teeth and fused glass discharged from the melting furnace is bitten by the teeth in order to mark or form grooves. The latter one uses a water supplying roller for intermittently supplying water to the glass bar in order to make cracks thereon and a holding system including a plurality of rollers, which system is complicated in its construction and expensive. It is difficult to control the force for holding the running glass bar and sustain it properly.

SUMMARY OF THE INVENTION

The present invention is directed to solve the shortcomings, mentioned-above, of the conventional apparatus for making glass pellets by the step of tracting the drawn glass throughout a long distance in air in order to form a long glass bar. According to the present invention, a method for producing a large quantity of glass pellets comprises the steps of conveying or tracting melted glass discharged from a melting furnace in the form of a glass bar by means of a chain conveyer and cutting small pieces from the conveyed glass bar by means of a cutter situated at a rear end of the chain conveyer The chain conveyer has a plurality of top plates fastened to respective chain members or limbs of the conveyer. The top plates are formed with two wing members slanted oppositely to each other so as to form a V-shape groove. Consequently, a long groove having a V-shape section is provided on an outer periphery of the conveyer by connecting successively one of the top plates to a next one and forming a line of chain links. The long groove formed on the conveyer is adapted to be used as a guiding and holding passage of the hot glass bar discharged from the melting furnace. During mass-manufacturing operation of the glass bar of the apparatus constructed according to the present invention, the glass bar discharged from the melting furnace drops by gravity onto the V-shape groove of the running chain conveyer and is firmly held within the groove as desired. The long glass bar positioned on the top plates of the running chain conveyer advances along with the chain conveyer and a particular sectional shape of the glass bar is obtained during its advancement along a longitudinal axis of the chain conveyer. The particular sectional shape of the glass bar, for example, round and ellipse, can be formed in a very short time by an air cooling or chilling operation when the glass bar advances along the chain conveyer. The air chilling operation is carried out by means of a blower system comprising an air duct extending in the longitudinal direction of the chain conveyer and a plurality of nozzles connected to the air duct and situated over the hot running glass bar. Owing to such forced air chilling provided by the blower, the conveying distance between the discharging mandrel or spout of the melting furnace and the cutter for cutting small pieces from glass bar can be shortened and consequently the space necessary for installing the chain conveyer is made small. Furthermore, only monitoring of the proper positioning of the glass bar discharged from the melting furnace is required in order to effectively actuate the glass pellet mass-manufacturing system of the present invention. The operator monitors the proper speed and volume of the discharged glass bar at the melting furnace and simultaneously the effective cutting operation of the cutter for cutting small pieces from the glass bar conveyed to the cutter.

As mentioned-above, the required length of the chain conveyer is determined upon consideration of chilling effects of the top plates and of the air blowing on the hot glass bar. The conveyed glass bar must be chilled to a proper temperature which is suitable for the glass bar to be effectively cut by the cutter. According to one of the advantages of the present invention, the apparatus for making the glass pellets has a forcible cooling or chilling system for the hot glass bar whiich is adapted to function to chill the hot bar until its temperature become suitable for the bar to be cut cleanly. The air chilling system of the present invention comprises a plurality of blowing nozzles for forcibly discharging air, for example cool fresh-air, passing therethrough. The outlets of the blowing nozzles are positioned just over a running passage of the glass bar so as to effectively cool the hot glass bar during operation of the apparatus. As the result of this, a length of the conveyer, which is determined in connection with an efficiency of the chilling system, can be shortened as much as possible and in consequence the ideal temperature for cutting the glass bar is obtained very rapidly and easily. Due to the pressing effect of the forced air flow, the glass bar is effectively held or pressed against the V-shape groove provided on the top plates of the chain conveyer, so that, when the V-shape groove is shallow in depth, the running glass bar is firmly held within the V-shape groove. Generally, the material conveyed by a chain conveyer disadvantageously vibrates and is sprung-up and down, resulting in damage suffered by the material being conveyed. In accordance with the above-mentioned advantage of the present invention, the running glass bar is surely conveyed at high-speed and effectivity supplied to the cutting means situated at an end of the chain conveyer without any vibration and springing up and down movements of the glass.

In addition, the present invention provides a new and improved cutting system for cutting into small pieces or pellets, the glass bar which is supplied to the cutter. The glass bar cutting system can be employed or assembled in a system as disclosed in an embodiment of a conveying system constructed according to the present invention or in any conventional conveying system such as Dunner's machine in which the glass bar runs in air. In accordance with a preferred embodiment of the present invention, a novel cutting system is situated at an end of a chain conveyer so as to cut small pieces from a glass bar conveyed along the chain conveyer. The cutting system comprises a cutter wheel provided with a plurality of striking blades which are swingably mounted around the periphery of a cutter wheel and also a set of supporting rollers for supporting the glass bar and increasing the cutting efficiency of the striking blades. More particularly, the set of supporting rollers includes an upper roller and a grooved lower roller, the upper roller pressing the upper surface of the glass bar and the lower roller supporting its lower surface. A vertical line passing through the upper surface of the glass bar pressed by the upper roller is displaced from a vertical line passing through an under surface engaged with or supported by the lower roller in such a manner that the pressing upper roller is placed in front of the supporting lower roller along the glass bar. Owing to the roller arrangement, the end portion of the glass bar placed under the upper roller is always pressed downwards or apt to be deflected around a point engaged with the lower roller. Consequently, the glass bar extending through the lower roller, or placed ahead of the vertical line passing through the lower roller, is easily and effectively cut when a striking impact of a blade is applied to an edge of the end portion. In short, the striking energy of the blade concentrates on the under surface of the glass bar supported by the lower roller.

OBJECTS OF THE INVENTION

It is, therefore, a primary object of the present invention to provide an apparatus for making glass pellets, which apparatus comprising a unique conveying system adapted to safely carry a glass bar and an effective chilling system for cooling the glass bar running along the conveying system.

Another object of the present invention is to provide a novel apparatus for mass-producing glass pellets which are uniform in size, which apparatus is capable of effectively lowering the degree of danger applied to operators.

Still another object of the present invention is to provide an apparatus for making glass pellets, which apparatus also comprises a chilling and guiding means adapted to change the guiding direction of a molten glass stream falling down onto the chilling and guiding means.

Still a further object of the present invention is to provide a novel cutting means for cutting small pieces from a glass bar running along a conveying system, such as a chain conveyor, when an end portion of a predetermined length of the glass bar is extended from a predetermined point on the conveying system.

Still a further object of the present invention is to provide a new and improved glass pellet mass-producing apparatus having a unique glass bar conveying system and a novel cutting device for cutting the glass bar into small pieces or pellets.

Other objects, features, and advantages of the present invention will become apparent by reading the following detailed description when taken in conjunction with the accompanying drawings.

BRIEF DESCRIPTION OF THE DRAWINGS

The drawings show an embodiment of the glass pellet mass-producing apparatus of the present invention.

FIG. 4 is a transverse vertical sectional view of the chain conveyer, FIG. 5 is an exploded view of a guiding and chilling plate and its supporting means, FIG. 6 is a perspective view of an air volume regulating means mounted on a forced cooling system.

DESCRIPTION OF THE PREFERRED EMBODIMENTS

Figure 1:
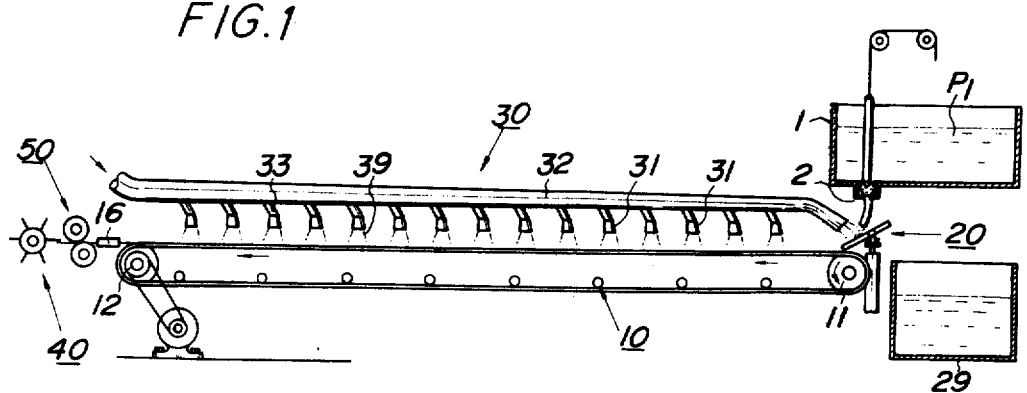
FIG. 1 is a general side view of the apparatus.
Figure 2:
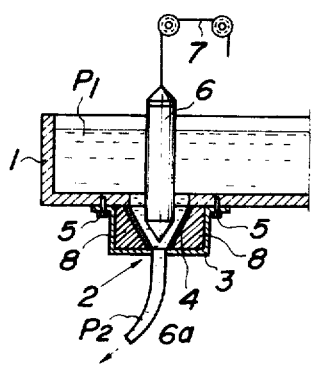
FIG. 2 is an enlarged sectional view of a molten glass discharging port.

As shown in FIG. 1, a melting furnace 1 has a discharging port 2, for molten glass, on its bottom. As clearly shown in FIG. 2, the discharging port 2 is comprised of an orifice 4 which is held at a predetermined position by means of a holder box 3. The holder box 3 is fastened to the furnace bottom by means of bolts 5, 5 and filled with a refractory material 8. The glass material or molten glass P1 contained in the melting furnace 1 is adapted to flow down gravitationally in the melting furnace 1 is adapted to flow down gravitationally through the orifice 4.

It is understood that a regulating plunger 6 is employed to control the flow of the glass material. The regulating plunger 6 is adapted to move vertically within the melting furnace and has an end portion 6a which is arranged within the space of the orifice 4 and moved up and down by means of a rope 7. Accordingly the volume of or the diameter of the stream of molten glass falling-down through the discharging port is freely controlled by moving the regulating plunger up and down. Also, the volume of the falling-down molten glass can be controlled on a large scale by replacing the orifice 4, provided with a certain discharging port 2, by another orifice provided with a larger or smaller port 2. The glass stream P2 discharged from the melting furnace 1 through the orifice 4 falls onto a chain conveyer 10. It is noted that the glass stream P2 is chilled and its flowing direction is controlled by a chilling and guiding device or member 20 before the glass material falls onto the chain conveyer. The function and construction of the chilling and guiding device or member 20 will be further explained in detail hereinafter.

Figure 3:
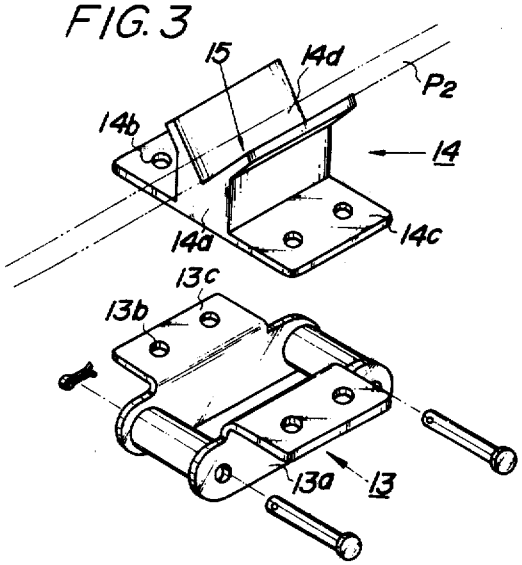
FIG. 3 is an enlarged perspective view of a chain element of a chain conveyer employed in the present invention.

According to the present invention, each element of chain conveyer 10 comprises a chain member 13 and a conveying member 14 mounted on the chain member 13. A rear end of the chain conveyer 10 is located substantially just under the discharging port 2. The conveying member 14 is constructed of a plurality of top plates 14a connected to each other in order to hold the glass bar P2 on the top plates 14a of the conveying member 14 of the chain conveyer 10. As clearly shown in FIG. 3, the top plates form a V-shape holder element 14d extending upwardly from an attaching plate 14c provided with bolt holes, the holder element 14d being connected integrally to the attaching plate 14c. The holder element 14d has, as shown in FIG. 3, a pair of wings which extend at a certain angle to each other so as to form a V-shape groove 15 on the top plate. The glass bar discharged from the melting furnace and placed on the chain conveyer is kept in and conveyed along the V-shape groove. During the conveying operation, the long glass bar is formed substantially round in section by means of the V-shape groove 15 of the top plates. The chain links 13a of the chain member 13 are connected to each other so as to form the chain conveyer of the present invention. The respective chain links 13a constituting the chain member 13 have a pair of attaching plates 13c provided with bolt holes. The respective attaching plates 13c, which extend horizontally from and are integrally connected to a pair of vertical chain links 13a, are attached to an under face of the attaching plates 14c of the conveying member 14 by means of nuts and bolts passing through the holes formed in the attaching plates 13c and 14c. Consequently, on a periphery of the chain conveyer, an endless conveying passage for the glass bar is obtained. The endless passage is formed by the continuity of the top plates 14a, so that the running glass bar P2 is safely and effectively conveyed and supplied to the cutting means.

In accordance with the present invention, the guiding and chilling member 20 is situated betwen the discharging port 2 of the melting furnace 1 and the adjacent end portion of the chain conveyer 10. As clearly shown in FIG. 5, the guiding and chilling member 20 has a trough or gutter 20a and molten glass material P1 is drawn from the melting furnace 1, falls down onto the trough 20a, slides along a bottom face of the trough and is placed onto the chain conveyer. The hot glass material P1 discharged from the melting furnace is guided keeping its proper falling direction and is chilled by means of the guiding and chilling member 20 during a sliding movement of the hot glass material P1 along the bottom face of the trough 20a of the member 20.

In order to cool the body of the chilling and guiding member 20 and a hot glass material passing along the length of the chilling member 20 by contacting the glass material with a cold chilling member 20, there is provided a cooling cavity for flowing a coolant, therethrough. The coolant such as water, is supplied and flows out through a coolant supply hose 20b and a flowing-out hose 20c. Both the hoses are connected to a water source and a water storage tank. In accordance with the present invention, the chilling and guiding member 20 is adapted to change its slanting direction into an opposite direction, or reversibly, and thus change the flowing direction of the glass material. In case of abruptly stopping the chain conveyer for any reason, the chilling and guiding member 20 is operated manually or by means of a tool in order to instantaneously change the flowing direction of the glass material from one directed toward the adjacent portion of the chain conveyer to another directed toward a water tank 29 for cooling the hot glass material. Thus, the dangerous or harmful hot glass stream is not accumulated or heaped on the adjacent portion of the stopping conveyer, whereby dangerous conditions for the operator are avoided deleted. Under the bottom surface of the chilling and guiding device or member, a pair of L-shape elements 20d and 20e, as shown in FIG. 5, are attached or welded. Within a space defined by the bottom face of the chilling and guiding device 20 and the pair of L-shape elements, a rib of a mounting member 27, having H-shape in section, is slidingly placed. A pair of side walls of the mounting member 27 are attached to the side surfaces of the chilling and guiding device 20 and triangular walls depending from the mounting member 27 are swingablly attached to an end portion of a sliding rod or piston rod 26 slidingly inserted into a cylinder 24. As clearly shown in FIG. 5, on the end portion of the piston rod 26, a fixing plate 21c provided with a pair of slanting angle control bolts 21a, 21b is arranged. Consequently, the slanting direction and angle of the chilling and guiding device 20 is limited or determined by extending or retracting the control bolts 21a, 21b. The length of the bolt portions extending above the fixing plate 21c can be adjusted in order to obtain a proper slanting angle of the chilling and guiding device 20. The distance between the L-shape elements 20d and 20e is longer than a width of the rib of the H-shape mounting member 27, so that the mounting member is able to slide along the bottom face of the device 20 or move within the space defined by the pair of L-shape elements 20d and 20e during a slanting direction changing movement of device 20.

It will be clearly understood from FIG. 5 that, when the chilling and guiding device 20 ascends rightward, the inclined left side face of a triangular suspending wall abuts against a head of the left bolt planted on the fixing plate 21c, so that a leftward descending position of the chilling and guiding device 20 is determined. On the contrary, the rightward descending position of the device 20 is kept by abutting of the inclined rightside face of the triangular suspending wall against a head of a right control bolt 21b.

In order to prevent the end of the chilling and guiding device 20 from engaging with the discharging port 2 of the melting furnace as aforementioned, the device 20 is moved or slid leftward and rightward to retract its upper end.

According to a feature of the present invention, the hot glass bar running along the chain conveyer is cooled by means of a forced cooling or chilling system 30. The forced cooling or chilling system 30 consists of a compressed-air supply duct 32 arranged over the chain conveyer and extending along the entire length of the conveyer As shown in FIG. 1, the compressed-air duct 32 has a plurality of branch ducts 33 and a blower (not shown) connected to an end of the duct 32. The branch ducts 33 have a respective nozzles 31 opening onto the hot glass bar P2 running along the chain conveyer. The other end of the compressed-air duct 32 of the forced cooling system 30 according to the present invention is arranged at and opened toward the chilling device 20 in order to cool it.

FIG. 6 shows an embodiment of a damper 39 adapted to regulate the air volume flowing or passing through a duct portion of the compressed-air duct 32. The damper 39 has a diameter substantially equal to or a little smaller than an inner diameter of the compressed-air duct 32, so that the damper can be rotated manually by means of a handle or a lever 35 disposed outside of the compressed-air duct 32. It will be appreciated that the handle 35 has a shaft 34 extending through a center of the damper 39 so as to rotate it around an axis of the shaft 34. The shaft 34 is, at its one end, connected to an end of the handle 35 at right angles with the end of the handle, this one end protruding through a peripheral wall of the compressed-air duct 32. In this way, the lever 35 extends along the direction of the length of the compressed-air duct 32.

On the peripheral wall of the duct 32, a scale 36 is mounted. The scale 36 may be formed in the shape of an arc and has an arcuate opening 37 as shown in FIG. 6. The lever 35 has a bolt and wing nut and the bolt slides within the arcuate opening 37 along with the lever or handle 35. Consequently, when the lever 35 is manipulated or revolved about the axis of the shaft 34, the volume of air flowing through the compressed-air duct 32 is freely regulated. The air volume is recognized by observing the angular position of the handle 35, so that a suitable temperature of the glass bar to be cut by the cutter is effectively determined.

Figure 7:
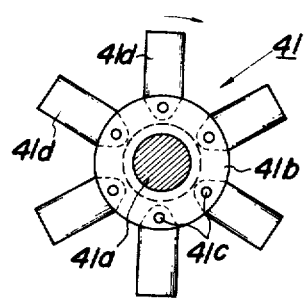
FIG. 7 is a side view of a blade wheel.
Figure 10:
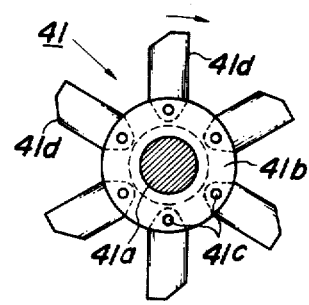
FIG. 10 shows another embodiment of the blade wheel.
Figure 9:
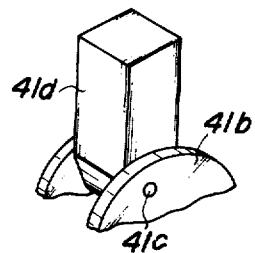
FIG. 9 is an enlarged perspective view of a blade.
Figure 8:
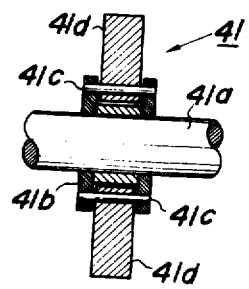
FIG. 8 is a vertical sectional viiew of the wheel.
Figure 13:
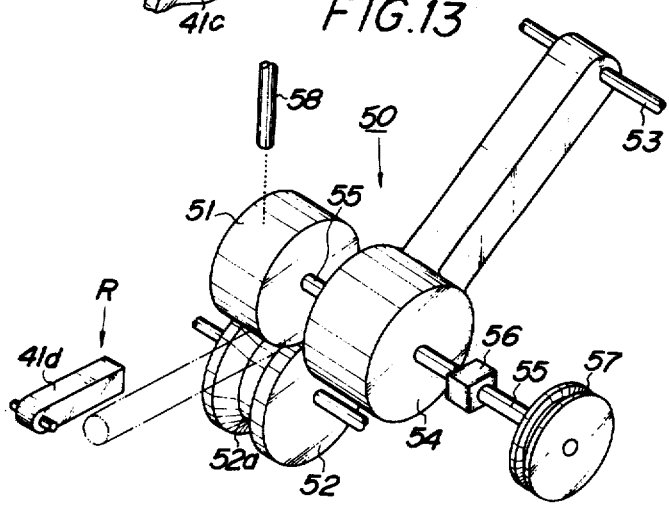
FIG. 12 is a corresponding plan view and FIG. 13 is an enlarged perspective view of the set of supporting rollers.

In accordance with the present invention, an unique system for cutting small pieces from the glass bar is provided, which cutting system does not need a plurality of rollers and a watering or cracking roller as shown in the Official Gazette disclosure of Japanese Utility Model; No.32137/1970 and also a set of grooving wheels described in the Official Gazette of Japanese Patents. The cutting system of the present invention has a blade wheel 41 and a set of rollers 51, 52. As shown in FIGS. 7, 8 and 9, the blade wheel 41 has a pair of flanges 41b integrally mounted on the left and right side faces and a plurality of blades 41d swingably attached to the flanges. The blades 41d swing around shafts 41c provided in the space formed between the flanges, so that the blades 41d respectively extend along radial directions of the blade wheel 41 during a high-speed rotational movement of the wheel 41 owing to a centrifugal force developed by a rotation of the wheel. The blades 41d for striking and cutting small pieces from the chilled glass bar have square-shapes in section and are made of rather heavy material. In order to prevent a blade of the wheel from engaging with the remaining end of a glass bar progressing along the chain conveyer after the blade has cut the end of the glass bar, each blade of the wheel has a cut portion at its edge as shown in FIG. 10. As clearly shown in FIG. 12, a shaft 41 of the blade wheel 41a passes through a bearing assembly 46 slidably mounted on a pair of guiding rods 47, 47. To the guiding rods, a fixing frame 42 provided with a screw rod 48 is fixed. When the screw rod 48 is rotated, the bearing assembly 46 is moved along the guiding rods and accordingly the blade wheel is moved along its radial direction. In this way, the particular point on the chilled glass bar to be struck by the blades of the wheel can be displaced along the extruding direction of the glass bar. The blade wheel 41 is rotated by means of an electric motor (not shown), and the motor torque is transferred to the wheel through a pulley 43 and a V-belt (not shown).

Figure 11:
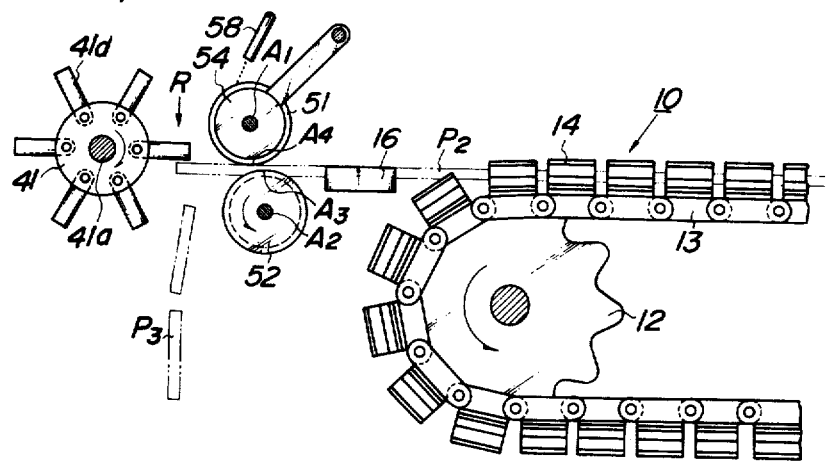
FIG. 11 is an elevation view of an arrangement of the blade wheel, a set of supporting rollers and an end portion of a glass bar running along the chain conveyer.
Figure 12:
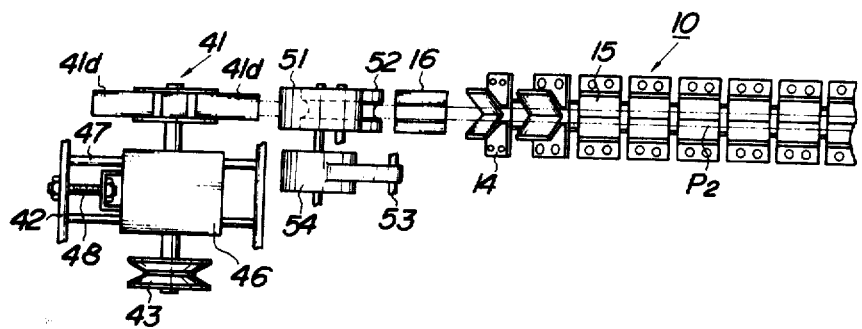

Now, steps applied to the glass bar P2 after it is separated from the chain conveyer 10 will be explained hereinafter referring to FIGS. 11 and 12. The glass bar P2 passes along a guide member 16 situated in front of a delivering end of the chain conveyer 10, so as to control a proper direction of the glass bar progressing toward a cutting station where the glass bar is cut into small pieces by means of a cutting means. Preferably, the guide member 16 has a groove along which the glass bar passes.

Between the guide member 16 and the cutting system, there is provided a glass bar holding apparatus 50 comprising an upper roller 51 and a lower roller 52. Both the rollers 51, 52 firmly embrace or hold the glass bar placed between them.

The upper roller 51 has a weight 54 and a pulley 57 adapted to be used for rotating the uppper roller 51 and the weight 54 by means of a shaft 55 passing through them. The upper roller 51 and the weight 54 swing around the axis of another shaft 53 and the upper roller 51 presses the glass bar running under it owing to the force of gravity of the weight. The shaft 55, on which the upper roller 51 and the weight 54, are secured is connected to the pulley through an universal joint 56, so that the upper roller 51 and the weight 54 are freely and vertically movable regardless of a position of the pulley 57. The distance between the outer periphery of the upper roller 51 and a bottom of a groove 52a is determined according to various sizes of the glass bar running between them. The lower roller 52 has the groove 52a formed around the periphery thereof, so as to firmly hold the glass bar. It is important to point out that a vertical line A1 passing through a center of the upper roller 51, and consequently of the weight 54 and the shaft 55, and another vertical line A2 passing through the center of grooved roller 52 are displaced from each other. Briefly, a point A4 of the vertical line A1 is in front of a point A3 of the vertical line A2 in order to press downward a forward end of the glass bar by the force of gravity due to the weight 54.

In this manner, when a blade of the wheel 41 strikes an extending end of the glass bar held by both the rollers 51 and 52, an impact force R is concentrated at the point A3 and consequently a forward end of the glass bar is cleanly cut or sharply broken off to its brittleness.

It will be appreciated that a multiple effect of the functions of the upper and lower rollers 51, 52 and of the blade wheel 41 advantageously is obtained. More particularly, the force of gravity due to the upper roller 51 and the weight 54 and the centrifugal force of the blade wheel 41 rotating at high-speed advantageously cooperate. The impact developed by a blade 41d of the high-speed rotating blade wheel 41, which blade 41d is centrifugally extended along a radial line of the wheel and applied to the glass bar, is advantageously considerably greater than that of a prior art blade wheel having a plurality of blades fixed to the wheel.

The outer periphery of the upper roller 51 is always wetted by, for example, a suitable quantity of water supplied through a watering conduit 58, so that the glass bar running through the upper roller 51 and the lower roller 52 is prevented from sliding between the rollers and additionally the hot glass bar is cooled. Consequently, the glass bar P2 is not excessively extended by the sliding preventing the cooling function of water dropping on the upper roller 51 while an impact or shock is applied to the glass bar, so that the cutter cuts small pieces from the long glass bar into an equal length pieces. It can be seen from the foregoing that the cutting system constructed according to the present invention is most preferably used or applied to the glass bar forming system comprising the chain conveyer according to the present invention. However, the cutting system of the present invention can be employed in a prior art apparatus for forming the glass bar such as that disclosed in the Dunner patent.

In accordance with the present invention, the glass pellets mass-producing apparatus operates substantially automatically. Briefly, in order to operate the glass pellets mass-producing system of the present invention, an operator only opens the discharging port of the molten glass material contained in the melting furnace 1 in order to discharge the glass by gravity the shape of stream onto the chain conveyer 10. Then, the hot glass material running along the chain conveyer is automatically chilled and formed into its bar-shape and conveyed to the cutting means. The length of the chain conveyer is shortened by employing the forced chilling system for the hot glass bar, so that only a small space is needed to install the entire plant of the glass pellets producing apparatus. An unskilled man can operate safely and effectively the glass pellets producing apparatus.

From the above, it should be apparent that Applicant has provided a new and improved safety apparatus for automatically mass-producing glass pellets and that certain changes, modifications, and adaptations may be made therein by those skilled in the art to which it relates, and it is intended to hereby cover all such modifications, changes, and adaptations which come within the scope of the appended claims.

We claim:

1. Apparatus for continuously mass-producing glass pellets comprising, in combination, a melting furnace having a gravity discharge port; means operable to controllably discharge a continuous stream of molten glass material through said discharge port; an endless chain conveyer constituted by a plurality of pivotally interconnected, V-shape cross-section holder elements, said conveyor having a receiving end beneath said discharge port for receiving, drawing and conveying a continuous length of the glass material discharged through said discharge port; a relatively elongated chilling and guiding means, formed with a glass material guiding groove, situated between said discharge port and the receiving end of said conveyor to receive, chill and guide the continuous length of glass material, and to direct it onto said conveyor; an elongated cooling means arranged above said conveyor and extending throughout the entire conveying length thereof for forcibly cooling the continuous length of glass material conveyed by said conveyor, to form a continuous length of glass material bar; cutting means arranged adjacent a discharge end of said conveyor, said cutting means including a bladed wheel having a plurality of blades operable to successively strike the glass bar continuously discharged from said chain conveyor to cut small pieces, of preselected length, from said glass bar; and glass bar holding means positioned between the discharge end of said chain conveyor and said cutting means and operable to support the glass bar discharged from said conveyor and to supply the glass bar to said cutting means; whereby glass pellets, of uniform length, are continuously formed by said apparatus.

2. Apparatus for continuously mass-producing glass pellets, as claimed in claim 1, in which said cooling means comprises an elongated compressed air supply duct having a plurality of longitudinally spaced branch ducts extending therefrom toward said conveyor, and each having a nozzle directed toward the continuous length of glass material conveyed by said conveyor; and a damper mounted in said compressed air supply duct and operable to regulate the volume of air flowing therethrough.

3. Apparatus for continuously mass-producing glass pellets, as claimed in claim 1, in which said blades are pivotally connected, at their inner ends, to said bladed wheel, for swinging about pivot axes extending parallel to the axis of rotation of said bladed wheel, said blades being extended radially from said bladed wheel by centrifugal force during rotation of said bladed wheel.

4. Apparatus for continuously mass-producing glass pellets, as claimed in claim 3, wherein the outer end of each blade is bevelled at its trailing edge to prevent engagement of its outer end with the uncut length of glass bar, progressing along said chain conveyor, after having cut a small length from the end of the glass bar.

5. Apparatus for continuously mass-producing glass pellets, as claimed in claim 1, including a molten glass cooling receptacle adjacent said chilling and guiding means; and means mounting said chilling and guiding means for tilting movement, about a horizontal axis, between a position in which it is inclined toward said conveyor and a position in which it is inclined toward said receptacle.

6. Apparatus for continuously mass-producing glass pellets, as claimed in claim 5, including adjustable means limiting the angle of inclination of said filling and guiding means in each of said positions.

7. Apparatus for continuously mass-producing glass pellets, as claimed in claim 1, in which said glass bar holding therebetween the glass bar discharged from said conveyor; the axis of rotation of said upper roller being displaced longitudinally, relative to the axis of rotation of said lower element, in the direction of conveying; and means mounting said upper roller for swinging, under the force of gravity, about a pivot axis spaced from its axis of rotation to exert pressure against the portion of the glass bar projecting, in the conveying direction, beyond said lower roller.

8. Apparatus for continuously mass-producing glass pellets, as claimed in claim 7, including means for constantly discharging a liquid coolant onto at least one of said upper and lower rollers, during operation, for preventing the glass bar from sliding from the space between said upper and lower rollers due to the shock of cutting of the glass bar by said bladed cutting wheel.

9. Apparatus for continuously mass-producing glass pellets, as claimed in claim 7, in which said lower roller has a grooved periphery for guiding the glass bar, said upper roller engaging the upper surface of said glass bar projecting from said groove periphery.

10. Apparatus for continuously mass producing glass pellets, as claimed in claim 9, including means operable to rotate said upper roller.

* * * * *